(12) United States Patent
Smith

(10) Patent No.: US 8,897,538 B1
(45) Date of Patent: Nov. 25, 2014

(54) DOCUMENT IMAGE CAPTURING AND PROCESSING

(71) Applicant: Vertifi Software, LLC, Burlington, MA (US)

(72) Inventor: Christopher Edward Smith, Brookline, NH (US)

( * ) Notice: Subject to any disclaimer, the term of this patent is extended or adjusted under 35 U.S.C. 154(b) by 0 days.

(21) Appl. No.: 14/202,164

(22) Filed: Mar. 10, 2014

Related U.S. Application Data

(60) Provisional application No. 61/869,814, filed on Aug. 26, 2013.

(51) Int. Cl.
*G06K 9/00* (2006.01)
*G06F 17/00* (2006.01)

(52) U.S. Cl.
CPC .................. *G06K 9/00442* (2013.01)
USPC ........................... 382/139; 382/266; 715/210

(58) Field of Classification Search
USPC ......... 382/100, 103, 106, 112–113, 135–139, 382/155, 162, 168, 173, 181–189, 199, 209, 382/232, 254, 266, 274, 276, 286–292, 305, 382/312, 165, 283; 715/201, 210; 375/240.15
See application file for complete search history.

(56) References Cited

U.S. PATENT DOCUMENTS

| | | | | |
|---|---|---|---|---|
| 5,896,176 A | * | 4/1999 | Das et al. | 375/240.15 |
| 8,417,059 B2 | * | 4/2013 | Yamada | 382/283 |
| 2009/0304299 A1 | * | 12/2009 | Motomura et al. | 382/254 |
| 2012/0033876 A1 | * | 2/2012 | Momeyer et al. | 382/165 |
| 2013/0185618 A1 | * | 7/2013 | Macciola et al. | 715/201 |

* cited by examiner

*Primary Examiner* — Seyed Azarian

(57) ABSTRACT

The present invention relates to the automated processing of documents and, more specifically, to methods and systems for aligning, capturing and processing document images using mobile and desktop devices. In accordance with various embodiments, methods and systems for document image alignment, capture, transmission, and verification are provided such that accurate data capture is optimized. These methods and systems may comprise capturing an image on a mobile or stationary device, converting the color image into a black and white image, testing the accuracy of the image captured and transmitted, and processing the image for data extraction. Additionally, these may comprise aiding the user in capturing the image, providing geometric correction of document images, converting the image to black and white, transmitting both the images to a server, optimizing image size, analyzing images using iterative and weighting procedures, and comparing data the images to maximize data capture confidence.

4 Claims, 8 Drawing Sheets

| [Top three rows, 23 non-zero pixel values] | | | 302 Gap | | | 304 Gap | | [Bottom three rows, 23 negative pixel values] | | |
|---|---|---|---|---|---|---|---|---|---|---|
| 1 | 0 | 1 | 0 | 0 | 0 | 0 | 0 | -1 | 0 | -1 |
| 0 | 1 | 0 | 0 | 0 | 0 | 0 | 0 | 0 | -1 | 0 |
| 1 | 0 | 1 | 0 | 0 | 0 | 0 | 0 | -1 | 0 | -1 |
| 0 | 1 | 0 | 0 | 0 | 0 | 0 | 0 | 0 | -1 | 0 |
| 1 | 0 | 1 | 0 | 0 | 0 | 0 | 0 | -1 | 0 | -1 |
| 0 | 1 | 0 | 0 | 0 | 0 | 0 | 0 | 0 | -1 | 0 |
| 1 | 0 | 1 | 0 | 0 | 0 | 0 | 0 | -1 | 0 | -1 |
| 0 | 1 | 0 | 0 | 0 | x | 0 | 0 | 0 | -1 | 0 |
| 1 | 0 | 1 | 0 | 0 | 0 | 0 | 0 | -1 | 0 | -1 |
| 0 | 1 | 0 | 0 | 0 | 0 | 0 | 0 | 0 | -1 | 0 |
| 1 | 0 | 1 | 0 | 0 | 0 | 0 | 0 | -1 | 0 | -1 |
| 0 | 1 | 0 | 0 | 0 | 0 | 0 | 0 | 0 | -1 | 0 |
| 1 | 0 | 1 | 0 | 0 | 0 | 0 | 0 | -1 | 0 | -1 |
| 0 | 1 | 0 | 0 | 0 | 0 | 0 | 0 | 0 | -1 | 0 |
| 1 | 0 | 1 | 0 | 0 | 0 | 0 | 0 | -1 | 0 | -1 |

FIG. 3

| Left 3 cols, 23 neg. pixels | | | ⁄402 Gap | | | ⁄404 Gap | | Right 3 cols, 23 non-zero pixels | | |
|---|---|---|---|---|---|---|---|---|---|---|
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | X | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |
| 0 | -1 | 0 | 0 | 0 | 0 | 0 | 0 | 0 | 1 | 0 |
| -1 | 0 | -1 | 0 | 0 | 0 | 0 | 0 | 1 | 0 | 1 |

FIG. 4

Kernel Box Blur Matrix

| | | | | | | | | | | | | | | |
|---|---|---|---|---|---|---|---|---|---|---|---|---|---|---|
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 1 | 1 | 0 | 1 | 0 | 1 | 0 | 1 | 0 | 1 | 0 | 1 | 0 | 1 | 1 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 |

FIG. 8

DOCUMENT IMAGE CAPTURING AND PROCESSING

CROSS-REFERENCE TO RELATED APPLICATION

This patent application claims the benefit of Application No. 61/869,814, filed on Aug. 26, 2013 as a provisional application for the invention claimed herein.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND

A number of technologies have been developed to provide businesses and consumers with the ability to transmit or deposit checks and other documents electronically via desktop and mobile devices. These technologies allow users to transmit instruments such as a check by sending an image from a device such as a scanner, cell phone, tablet device, or digital camera, in a matter of minutes. Users can snap a picture of a document such as a check using the camera in such devices and then transmit the document image for further processing, such as submission for deposit into an account. These technologies can save money for institutions by reducing item processing costs and labor expense, and can provide substantial convenience for businesses and individuals.

The issues that must be addressed by these technologies include capturing an accurate image of the document, effectively and efficiently communicating with the user regarding the adequacy of that image, and verifying the accuracy of the data capture from the image. Problems in reading the document may arise from finding the document within the photograph; accounting for uneven lighting conditions; addressing skewed, warped, or keystoned photographs; identifying the size and scale of the document; and using optical character recognition ("OCR") technology to read the document. Other technologies employ various tools to attempt to address these problems. These typically involve taking a photograph of the financial instrument, transmitting the photograph to a distant server, allowing the server software to evaluate the image, and, if the image is found inadequate, communicating the failure back to the user, who must then make appropriate adjustments and try again.

SUMMARY

Embodiments of the systems and methods described herein facilitate image capture and processing of images by providing enhancement of image capture and extraction of data. Some systems and methods described herein specifically involve a stationary or mobile communications device that optimizes the readability of the image it captures before transmission to a server for image quality testing and interpretation. Some embodiments provide efficient and effective means for testing the accuracy of data transmission and extraction.

The present invention involves methods and systems for capturing and processing document images using mobile and desktop devices. In accordance with various embodiments, methods and systems for capturing an image of a document are provided such that the image is optimized and enhanced for image transmission and subsequent analysis and data extraction. These methods and systems may comprise locating, aligning, and optimizing an image of a document, capturing the image in a photograph, finding the edges or corners of the document within the photograph to develop a cropped color image, scaling the image within a specified pixel range, converting the color image to a black and white image, transmitting the image to a server, and performing quality tests on the black and white image. In some embodiments, the color image of the document also is transmitted to the server and additional tests are performed on said color image to confirm or enhance data interpretation. For example, a mobile communication device, such as a camera phone, would take a photograph of the document, convert it to black and white, and transmit it to a server where its quality may be further tested, while the color image may also be transmitted for testing and analysis.

Some embodiments of the invention may allow the user to transmit images of the documents using a mobile communication device such as, for example, a mobile telephone with a camera. Other embodiments of the invention may allow the users to transmit images of the documents using a desktop device or other stationary device such as, for example, a scanner and computer.

In accordance with some embodiments of the invention, methods and systems for document capture on a desktop or mobile device further comprise requiring a user to login to an application. In this way access to the document capture system using a mobile communication device might be limited to authorized users. The methods and systems may further comprise selecting a type of document and entering an amount. Some systems may receive a status of the document processing at the desktop or mobile device.

The present invention uses on-device software to provide immediate feedback to the user as to whether the quality of the document photograph is sufficient for processing. That feedback is provided without the need for intermediate communication with a server. The invention also provides geometric correction of the document image and uses unique weighting, iterative, comparative, and evaluative testing processes at multiple pixel densities to improve the accuracy and reliability of the reading of the document once transmitted. The invention provides greater compatibility with graphic processing units ("CPUs") in the color to black and white conversion process and is less affected by variances in luminosity across the check image. Ultimately, this results in cleaner images, as well as faster conversion time. The invention also provides better magnetic character ink recognition ("MICR") read rates and better "amount" read rates. In some embodiments, the invention transmits from the user device to the server a color image of the document in addition to the black and white images of the document. The color image can then be used, in combination with the black and white image, to more confidently read the document.

DESCRIPTION OF THE DRAWINGS

The present invention is described in detail with reference to the following figures. The drawings are provided for purposes of illustration only and merely to depict example embodiments of the invention. These drawing are for illustrative purposes and are not necessarily drawn to scale.

FIG. 3 provides an example of a "picket fence" unit matrix for calculating y-axis corner values.

FIG. 4 provides an example of such a "picket fence" unit matrix for calculating x-axis corner values.

FIG. 8 is an example of a kernel box blur matrix.

DETAILED DESCRIPTION

Figure 1:
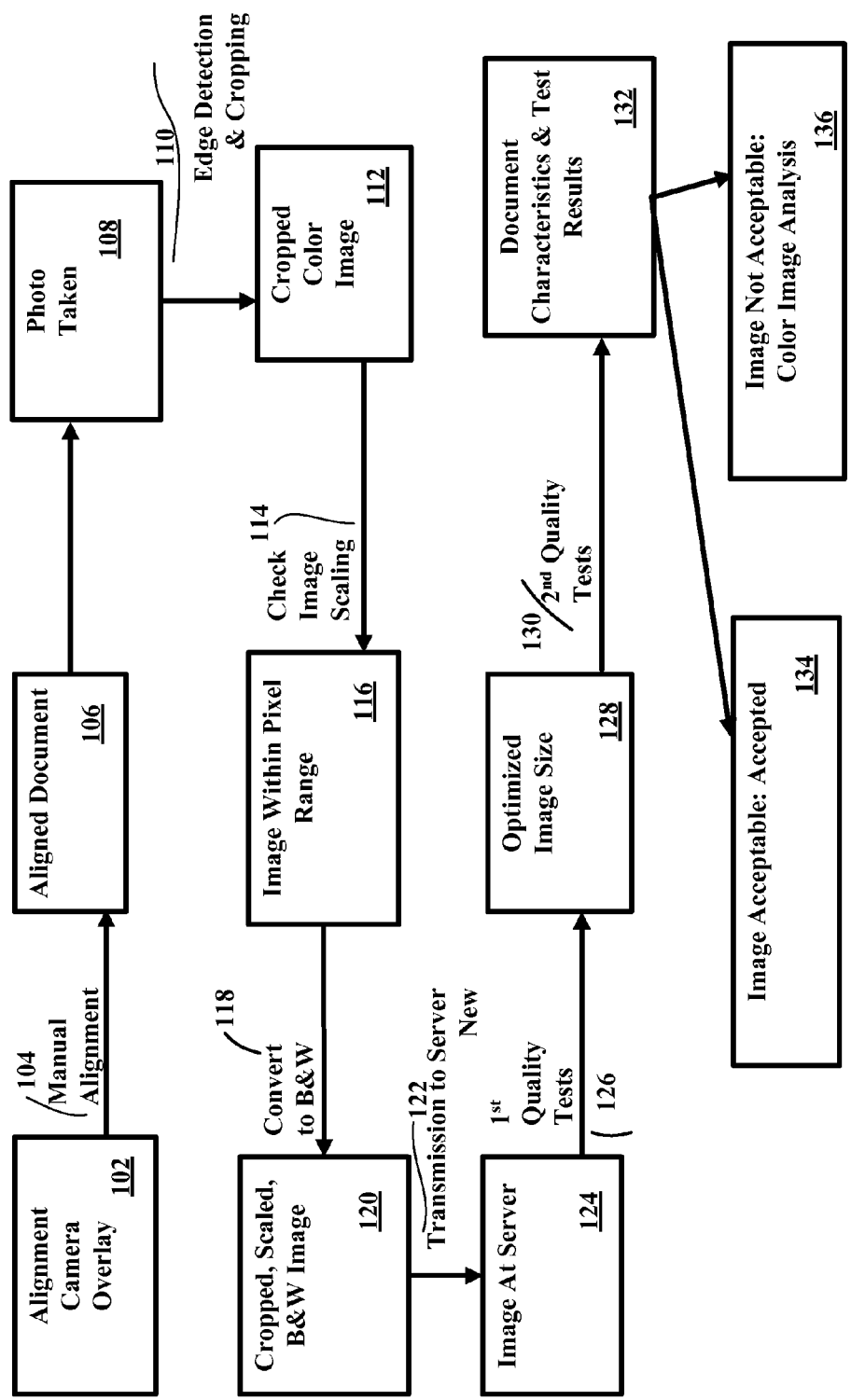
FIG. 1 is a process flow diagram showing the various processing steps the present invention embodies.

The present invention acquires, transmits, and tests images of the target document in the manner described below. FIG. 1 depicts the overall process encompassed by the invention.

A. Rough Alignment.

First, an alignment camera overlay 102 is provided that helps the user to focus a camera device on the target document. The device contains software that presents the user with an overlay on the camera view finder to assist the user in aligning 104 the document properly 106. The camera overlay provides a well defined sub-region within the view finder picture for location of the check document, and helps the user to ensure that the check is upright and reasonably aligned horizontally. In one embodiment, the sub-region within the view finder picture is provided with the use of software that allows recognition of the edges of the document. In another embodiment, the software allows recognition of the corners of the document. The alignment device then correlates alignment guides on the view finder of the picture-taking device to allow the user to align the document within the guides. In this way, the real-time corner/edge detection software provides graphical cues to the user on the overlay that the document is being properly located within the camera view.

Data may be provided to the user that the image within the view finder is insufficiently aligned. For example, the overlay in the viewfinder on the user device may present the user with corner indicators as the corners are detected in the view finder. The software within the device may calculate the relative height or vertical alignment of adjacent corners, and portray the estimated corners in the viewfinder in one color if sufficiently aligned and another color if insufficiently aligned.

B. Photograph.

The camera device is then used to take a picture 108 of the front of the document. It may also be used to take a picture of the back of the document.

C. Image Cropping.

Figure 2:
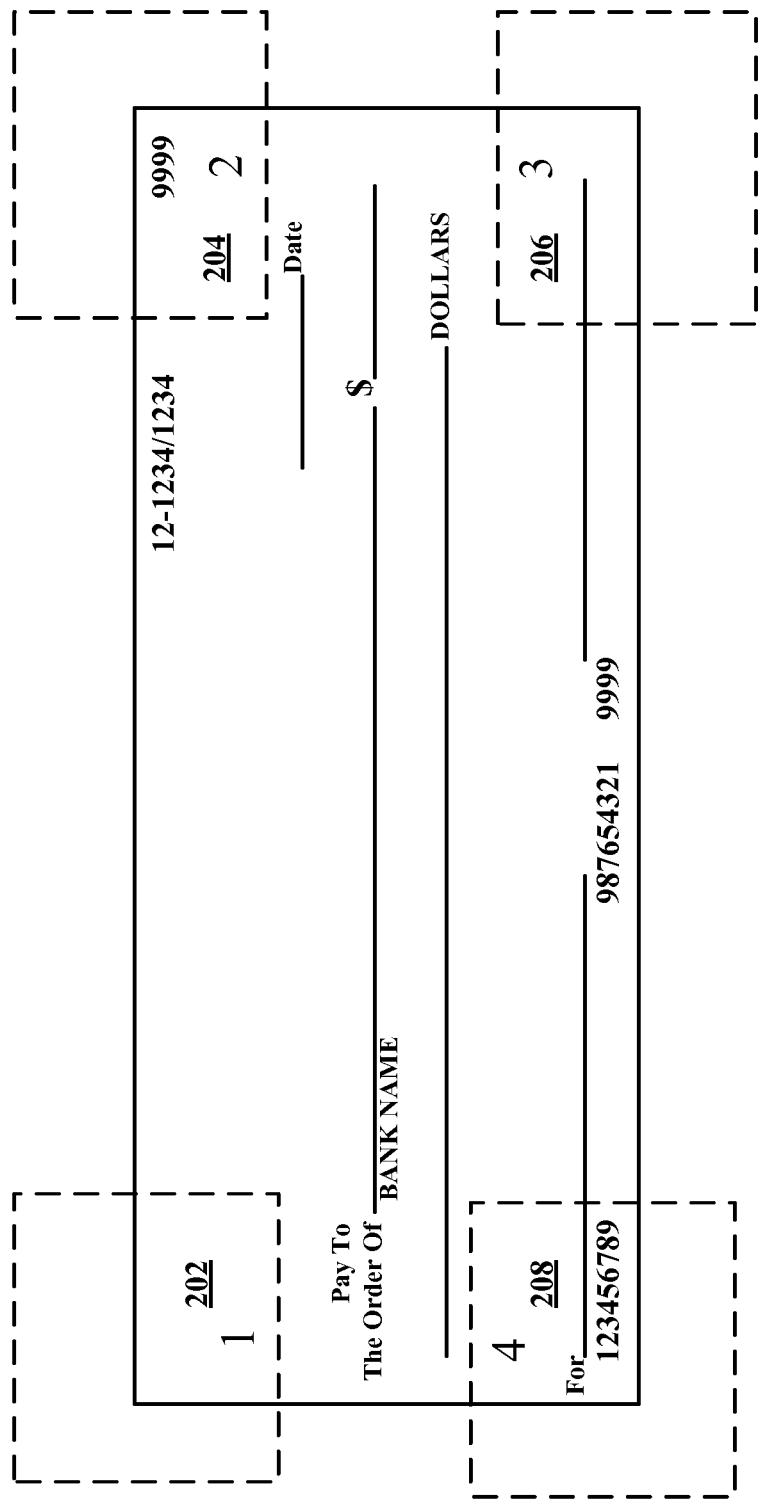
FIG. 2 provides an example of document image Subregions.

The edges or corners of the image of the document within the photograph are then found 110. In some embodiments of the invention, this is done in a second, smaller subregion (the "Subregion") that is created as an overlay of the viewport. FIG. 2 provides an example of such a Subregion. Four such Subregions, each including a corner of the document image, are created, each spanning a rectangle that is a set percentage of the horizontal width (for example, 20%) and another set percentage of the vertical height (for example, 40%) of the viewport. For example, the four Subregions may be defined in some order of the following:

1. upper left 202, starting from top left, go 20% of check width to the right, then down 40% of height;
2. upper right 204, starting from top right, go 20% of check width to the left, then down 40% of height;
3. bottom right 206, starting from bottom right, go 20% of check width to the left, then up 40% of height; and
4. bottom left 208, starting from bottom left, go 20% of check width to the right, then up 40% of height.

A device may be provided that measures the luminosity of each pixel within the image or a Subregion. The edges or corners of the image of the document image are then found measuring the luminosity of pixels in a fixed set of columns (a "picket fence"). For example, the top edge of the image of the financial document may be searched from the top-down of the image or Subregion (defined by the camera overlay). When a change in average luminosity above a fixed threshold is sensed, a document edge is identified. The bottom edge may then be searched form the bottom-up of the sub-region, similarly identifying the document edge on the basis of a change in average luminosity. The axes are then changed, and the process is repeated in order to find the right and left side images of the check image document.

In some embodiments, after the luminosity of the pixels is measured, a "blurring" process is applied to remove localized pixel luminosity variance by averaging luminosity in small regions about each pixel within a Subregion. This may be done by weighting each pixel proportionately by the luminosity of its neighboring pixels. For example, where $P_{R,C}$ is the pixel luminosity in row R and column C of the Subregion, then a given range of pixels to the left, right, above, and below, such as

| | | | | |
|---|---|---|---|---|
| $P_{R-2,C-2}$ | $P_{R-2,C-1}$ | $P_{R-2,C}$ | $P_{R-2,C+1}$ | $P_{R-2,C+2}$ |
| $P_{R-1,C-2}$ | $P_{R-1,C-1}$ | $P_{R-1,C}$ | $P_{R-1,C+1}$ | $P_{R-1,C+2}$ |
| $P_{R,C-2}$ | $P_{R,C-1}$ | $P_{R,C}$ | $P_{R,C+1}$ | $P_{R,C+2}$ |
| $P_{R+1,C-2}$ | $P_{R+1,C-1}$ | $P_{R+1,C}$ | $P_{R+1,C+1}$ | $P_{R+1,C+2}$ |
| $P_{R+2,C-2}$ | $P_{R+2,C-1}$ | $P_{R+2,C}$ | $P_{R+2,C+1}$ | $P_{R+2,C+2}$ | may be multiplied by a set of corresponding weighting, or "blur" factors, or Blur Kernel, such as

| | | | | |
|---|---|---|---|---|
| $B_{R-2,C-2}$ | $B_{R-2,C-1}$ | $B_{R-2,C}$ | $B_{R-2,C+1}$ | $B_{R-2,C+2}$ |
| $B_{R-1,C-2}$ | $B_{R-1,C-1}$ | $B_{R-1,C}$ | $B_{R-1,C+1}$ | $B_{R-1,C+2}$ |
| $B_{R,C-2}$ | $B_{R,C-1}$ | $B_{R,C}$ | $B_{R,C+1}$ | $B_{R,C+2}$ |
| $B_{R+1,C-2}$ | $B_{R+1,C-1}$ | $B_{R+1,C}$ | $B_{R+1C+1}$ | $B_{R+1,C+2}$ |
| $B_{R+2,C-2}$ | $B_{R+2,C-1}$ | $B_{R+2,C}$ | $B_{R+2,C+1}$ | $B_{R+2,C+2}$ |

The blurred value of $P_{R,C}$, or $P'_{R,C}$, is set to be the sum of the products of the neighborhood pixels and their respective blur factors, divided by the sum of the blur factors. That is:

$$(P_{R-2,C-2} \times B_{R-2,C-2}) + (P_{R-2,C-1} \times B_{R-2,C-1}) + (P_{R-2,C} \times B_{R-2,C}) + (P_{R-2,C+1} \times B_{R-2,C+1}) + (P_{R-2,C+2} \times B_{R-2,C+2}) + (P_{R-1,C-2} \times B_{R-1,C-2}) + (P_{R-1,C-1} \times B_{R-2,C-1}) + \ldots + (P_{R+2,C+2} \times B_{R+2,C+2})$$

or $$\Sigma(P_{i,j} \times B_{i,j}) \text{ for } _{i=R-2,j=C-2} \text{ to } _{i=R+2,j=C+2}$$

divided by $$B_{R-2,C-2} + B_{R-2,C-1} + B_{R-2,C} + B_{R-2,C+1} + B_{R-2,C+2} + B_{R-1,C-2} + \ldots + B_{R+2,C+2}$$

or $$\Sigma(B_{i,j}) \text{ for } _{i=R-2,j=C-2} \text{ to } _{i=R+2,j=C+2}$$

That is: $P'_{R,C} = [\Sigma(P_{i,j} \times B_{i,j}) \text{ for } _{i=R-2,j=C-2} \text{ to } _{i=R+2,j=C+2}]/[\Sigma(B_{i,j}) \text{ for } _{i=R-2,j=C-2} \text{ to } _{i=R+2,j=C+2}]$

NUMERICAL EXAMPLE

Luminosity (L) may be defined as L=0.299R+0.587G+0.114B, where R=red, G=green, B=blue channel colors. Luminosity values of pixels may range from 0 to 255. The values of pixels for a subarea within the upper left Subregion of the document may be measured by the device around the pixel $P_{R,C}$ (96) as:

| 100 | 110 | 100 | 108 | 106 |
|-----|-----|-----|-----|-----|
| 100 | 102 | 98  | 102 | 112 |
| 100 | 102 | 96  | 104 | 108 |
| 100 | 104 | 100 | 108 | 106 |
| 100 | 112 | 102 | 112 | 104 |

Each pixel in the Subregion may then be run through a weighting matrix such as (where, in this example, $B_{R,C}$=5):

| 1 | 1 | 2 | 1 | 1 |
|---|---|---|---|---|
| 1 | 3 | 4 | 3 | 1 |
| 2 | 4 | 5 | 4 | 2 |
| 1 | 3 | 4 | 3 | 1 |
| 1 | 1 | 2 | 1 | 1 |

That is, each "blur" number in the above matrix is the multiple by which its corresponding pixel is multiplied when evaluating pixel $P_{R,C}$ (96). Thus, in this example, the pixel of concern, $P_{R,C}$ (96), is weighted most heavily, and pixels are weighted less heavily as one moves away from the pixel of concern. If each pixel in the neighborhood of $P_{R,C}$ (96) is multiplied by its corresponding blur factor, a new matrix can be created; that is, each $P_{i,j} \times B_{i,j}$ value using the above values would be:

| 100 | 110 | 200 | 108 | 106 |
|-----|-----|-----|-----|-----|
| 100 | 306 | 392 | 306 | 112 |
| 200 | 408 | 480 | 416 | 216 |
| 100 | 312 | 400 | 324 | 106 |
| 100 | 112 | 204 | 112 | 104 |

Taking the sum of these, that is, $[\Sigma(P_{i,j} \times B_{i,j})$ for $_{i=R-2, j=C-2}$ to $_{i=R+2, j=C+2}]$=5434. Divide this by the sum of the weights; in this case 53 (i.e., the sum of 1+1+2+1+1+1+3+4+3+1+2+4+5+4+2+1+3+ . . . +1 [as determined by $\Sigma(B_{i,j})$] for $_{i=R-2, j=C-2}$ to $_{i=R+2, j=C+2}$]).

So that $P'_{R,C}$ (96) = $[\Sigma(P_{i,j} \times$ $B_{i,j})$ for $_{i=R-2, j=C,2}$ to $_{i=R+2, j=C+2}]/$ $\left[\sum (B_{i,j}) \text{ for } _{i=R-2, j=C-2} \text{ to } _{i=R+2, j=C+2}\right]$ = 5434/53 = 102.5

Thus, the "blurred" luminosity value of the pixel in this example, $P'_{R,C}$ (96), with an actual value of 96 is 102.5.

Each pixel in the Subregion is treated accordingly, and a new, "blurred" version of the original pixel grid for the image is created. The effect is a smoothed set of image values, where random, sharp spikes of luminosity have been eliminated, thus helping to more definitively identify where the actual substantive changes in luminosity, and thus the edges, are located in the image. The blurred values of luminosity can then be used to find the edges of the document.

In some embodiments of the invention, the blurred pixel values are used to determine the x and y coordinates for each corner of the document. This may be done as described below. The order presented below for determination of each coordinate and as applied to each corner location is by way of example only.

Candidate horizontal edge locations for the document are determined by evaluating samples of blurred pixel values above and below potential edge points to identify significant changes in luminosity in a generally vertical direction. This may be accomplished by testing values along a column (or otherwise in a generally vertical direction) of the blurred pixel values as determined above, to identify significant transitions.

This step may also be aided by creating a "picket fence" of pixel values to be included in each evaluation, by using a unit matrix of the following form, where X is the pixel location to be evaluated. FIG. 3 provides an example of such a unit matrix. In this step, as suggested by the following example, one or more rows of pixels above and below the point of interest 302, 304 may be skipped ("Gap"): (1) to help account for some skewing of the image that may have occurred when captured; and (2) to more efficiently identify the approximate image edge due to the somewhat broader luminosity transition area across several rows of pixels caused by the blurring.

If the location of the target blurred pixel P' to be evaluated is identified as $X_{a,b}$, then each of the other corresponding unit values can be identified by $X_{a \pm i, b \pm j}$, where i and j designate the number of rows and columns, respectively, from $X_{a,b}$ that the value is located in the matrix.

The blurred pixel values around each pixel are then adjusted to help evaluate the likelihood that the y-axis location of each blurred pixel in the Subregion is a location of image transition. This may be done by multiplying the neighboring blurred pixel values of each blurred pixel by the corresponding unit value in the unit matrix of FIG. 3. That is, in the above example, a new matrix may be created for each blurred pixel value $P_{a,b}$ by multiplying each pixel in its neighborhood, $P_{a \pm i, b \pm j}$, by its corresponding unit value at $X_{a \pm i, b \pm j}$ (that is, $P_{a \pm i, b \pm j} \cdot X_{a \pm i, b \pm j}$). In this example, there will be 23 non-zero values above, and 23 non-zero values below, the target pixel value, $P_{a,b}$.

Average luminosity differences are then calculated to determine candidate locations for the y-coordinate of the horizontal edge or the corner. The resulting values in the rows above the target pixel are summed, as are the resulting values of the rows of pixels below the target pixel. The difference between the two sums is then calculated (the "Upper/Lower Blurred Pixel Sum Diff"). If the Upper/Lower Blurred Pixel Sum Diff exceeds a specified threshold, that pixel location is a candidate location for the vertical (y-axis) location of the horizontal edge. In such a case, both the y-axis location of the "edge" candidate pixel and its Upper/Lower Blurred Pixel Sum Diff (the difference of "above" and "below" totals for that pixel) are recorded. The results of the y-axis location of the candidate "edge" pixel location and its Blurred Pixel Sum Diff are tabled. When 12 such significant y-axis edge locations and corresponding Blurred Pixel Sum Diffs have been identified moving horizontally through the Subregion, the process stops and a single edge y-coordinate is calculated.

This calculation may be accomplished on the device by use of histograms. For example, for each pixel location identified as a candidate "edge" location, the device may calculate how many other pixel locations within the table, created as described above, have y-values within some specified y-value range. This creates a third, histogram ("H") column of frequency of y-axis values within that y value range, an example of which is shown below.

| Pixel Column | y-value of candidate pixel | H | Upper/Lower Blurred Pixel Sum Diff |
|---|---|---|---|
| 1 | 125 | 10 | 20 |
| 2 | 127 | 9 | 22 |
| 3 | 120 | 10 | 24 |
| 4 | 140 | 1 | 20 |
| 5 | 122 | 10 | 18 |
| 6 | 124 | 9 | 16 |
| 7 | 118 | 9 | 17 |
| 8 | 120 | 10 | 20 |
| 9 | 135 | 4 | 10 |
| 10 | 121 | 9 | 21 |
| 11 | 125 | 10 | 19 |
| 12 | 130 | 8 | 22 |

The location for the edge or corner will be chosen as the y-value with both the highest H value (i.e., the one with the greatest number of other nearby y-axis edge locations within that y-axis range) and, if more than one location with the same H value, the location with that H value with the greatest corresponding luminosity difference ("tie breaker"). In this example, the selected y-value would be 120.

A similar analysis is conducted using the same blurred set of pixel values for the quadrant Subregion, except that candidate locations along a second coordinate axis, for example the x-axis, are identified to determine the second coordinate for the edge corner in that quadrant. Candidate vertical edge locations are determined by evaluating samples of blurred pixels to the left and to the right of potential edge points to identify significant changes in luminosity in a generally horizontal direction. This may be accomplished by testing values along a row (or otherwise in a general horizontal direction) of the blurred pixel values as determined above, to identify significant transitions.

This step also may also be aided by creating a "picket fence" of pixel values to be included in each evaluation, by using a unit matrix of the form shown in FIG. 4, where X is the pixel location to be evaluated. In this step, as suggested by the following example, one or more columns of pixels to the left and to the right of the point of interest 402, 404 may be skipped ("Gap") for the same reasons as discussed above; that is: (1) to help account for some skewing of the image that may have occurred when the image was captured; and (2) to more efficiently identify the approximate image edge due to the somewhat broader luminosity transition area across several columns of pixels caused by the blurring.

As above, if the location of the target blurred pixel P' to be evaluated is identified as $X_{a,b}$ then each of the other corresponding unit values can be identified by $X_{a\pm i, b\pm j}$, where i and j designate the number of rows and columns, respectively, from $X_{a,b}$ that the value is located in the matrix.

Similar to the evaluation of the location of the y coordinate of the horizontal edge, the likelihood that the x-axis location of each blurred pixel in the Subregion is the location of transition for the vertical axis is evaluated by multiplying its neighboring blurred pixel values by the corresponding unit value in the unit matrix of FIG. 4. That is, in the above example, a new matrix is created for each blurred pixel value $P_{a,b}$ by multiplying each pixel in its neighborhood, $P_{a\pm i, b\pm j}$, by its corresponding unit value at $X_{a\pm i, b\pm j}$ (that is, $P_{a\pm i, b\pm j} \cdot X_{a\pm i, b\pm j}$). In this example, there will be 23 non-zero values to the left of, and 23 non-zero values to the right of, the target pixel value, $P_{a,b}$.

The resulting values in the columns to the left of the target pixel are summed, as are the resulting values of the columns to the right of the target pixel. The difference between the two sums is then calculated (the "Left/Right Blurred Pixel Sum Diff"). If the Left/Right Blurred Pixel Sum Diff exceeds a specified threshold, that pixel location is a candidate location for the horizontal (x-axis) location of the vertical edge. In such case, the device records both the x-axis location of the "edge" candidate pixel and its Left/Right Blurred Pixel Sum Diff (the difference of "left" and "right" totals for that pixel). The results of the x-axis location of the candidate "edge" pixel location and its Left/Right Blurred Pixel Sum Diff are tabled. When the device identifies 12 such significant x-axis edge locations and corresponding Left/Right Blurred Pixel Sum Diffs moving through the Subregion, the process stops and a single edge x-coordinate is calculated as described below.

Similar to determining the location of the horizontal edge, for each pixel location identified as a candidate "edge" or corner location, calculate how many other pixel locations within the table have x-values within some specified x-value range. This creates a histogram ("H") column of frequency of x-axis values within that x value range, an example of which is shown below.

| Pixel Row | x-value of candidate pixel | H | Left/Right Blurred Pixel Sum Diff |
|---|---|---|---|
| 1 | 47 | 10 | 20 |
| 2 | 44 | 9 | 22 |
| 3 | 45 | 10 | 24 |
| 4 | 30 | 1 | 20 |
| 5 | 40 | 7 | 26 |
| 6 | 44 | 9 | 16 |
| 7 | 39 | 6 | 20 |
| 8 | 41 | 7 | 19 |
| 9 | 43 | 8 | 21 |
| 10 | 29 | 1 | 18 |
| 11 | 45 | 10 | 19 |
| 12 | 35 | 5 | 22 |

The location for the edge will be chosen as the x-value with both the highest H value (i.e., the one with the greatest number of other nearby x-axis edge locations within that x-axis range) and, if more than one location with the same H value, the location with that H value with the greatest corresponding luminosity difference ("tie breaker"). In this example, the selected x-value would be 45.

Thus, the upper left coordinates 502 of the image, that is, corner 1, in this example would be =45, 120. See FIG. 5.

The process may then be repeated for each of the quadrant Subregions to determine $x_{ci}, y_{ci}$ coordinates for each corner of check image; that is, in addition to $x_{c1}, y_{c1}$ (corner 1) 502, determine $x_{c2}, y_{c2}$ (corner 2) 504; $x_{c3}, y_{c3}$ (corner 3) 506; and $x_{c4}, y_{c4}$ (corner 4) 508 using the above methodology applied to each quadrant Subregion. If one corner cannot be identified using the above methodology, that corner may be assigned the x coordinate of its vertically adjacent corner and y coordinate of its horizontally adjacent corner. If more than one corner cannot be identified, the process cannot be completed and the image is rejected. Completion of the process defines a quadrilateral 510. An example is presented in FIG. 5.

Figure 6:
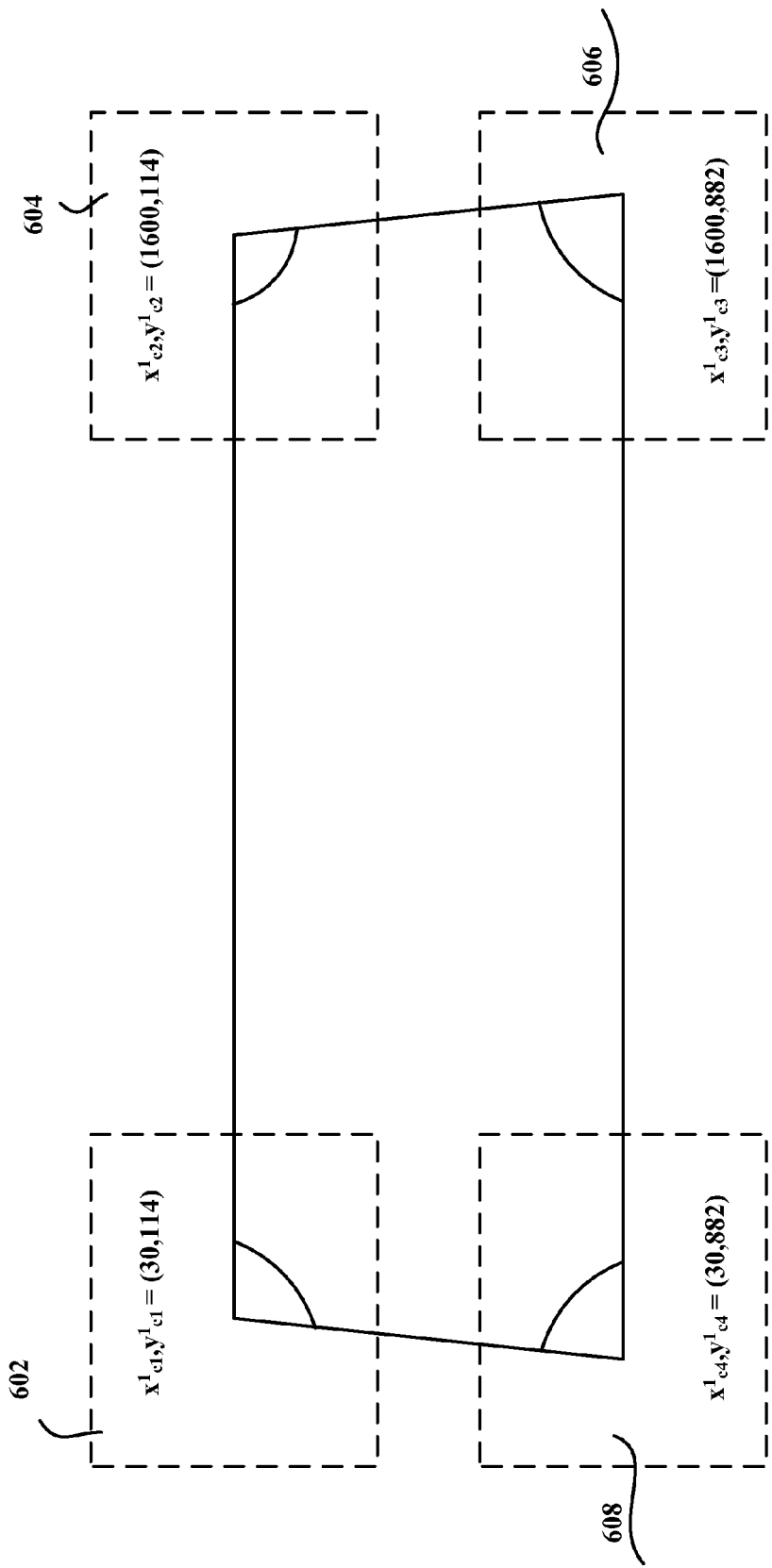
FIG. 6 provides an example of a cropping rectangle.

In some embodiments, a cropping, or enclosing, rectangle with cropping corners ($x'_{ci}, y'_{ci}$) (see FIG. 6) is constructed using the coordinates for the corners calculated above. For example, assuming increasing x coordinate values from left to right, and increasing y coordinate values from top to bottom, the coordinates of the cropping rectangle may be determined as follows:

For left upper cropping corner (cropping corner 1) 602 of cropping rectangle ($x'_{c1}, y'_{c1}$):
  $x'_{c,1}$=lesser of two x-coordinates for the left two corners; that is min($x_{c1}$, $x_{c4}$)
  $y'_{c,1}$=lesser of two y-coordinates for upper two corners; that is, min ($y_{c1}$, $y_{c2}$)

For right upper cropping corner (cropping corner 2) 604 of cropping rectangle ($x'_{c2}, y'_{c2}$):
  $x'_{c,2}$=greater of two x-coordinates for the right two corners; that is, max($x_{c2}$, $x_{c3}$)
  $y'_{c,2}$=lesser of two y-coordinates for upper two corners; that is, min ($y_{c1}$, $y_{c2}$) [i.e., same as for left upper]

For right lower corner (corrected corner 3) 606 of cropping rectangle ($x'_{c3}, y'_{c3}$):
  $x'_{c,3}$=greater of two x-coordinates for the right two corners; that is, max($x_{c2}$, $x_{c3}$) [same as for right upper],
  $y'_{c,3}$=greater of two y-coordinates for lower two corners; that is, min ($y_{y3}$, $y_{c4}$)

For left lower corner (corrected corner 4) 608 of cropping rectangle ($x'_{c4}, y'_{c4}$):
  $x'_{c,4}$=lesser of two x-coordinates for the right two corners; that is min($x_{c1}$, $x_{c4}$) [i.e., same as for left upper],
  $v'_{c,4}$=greater of two y-coordinates for lower two corners min ($y_{c3}$, $y_{c4}$) [same as for right lower].

This cropping rectangle will fully contain the four original corners 504, 506, 508, 510 that have been previously located.

Figure 7:
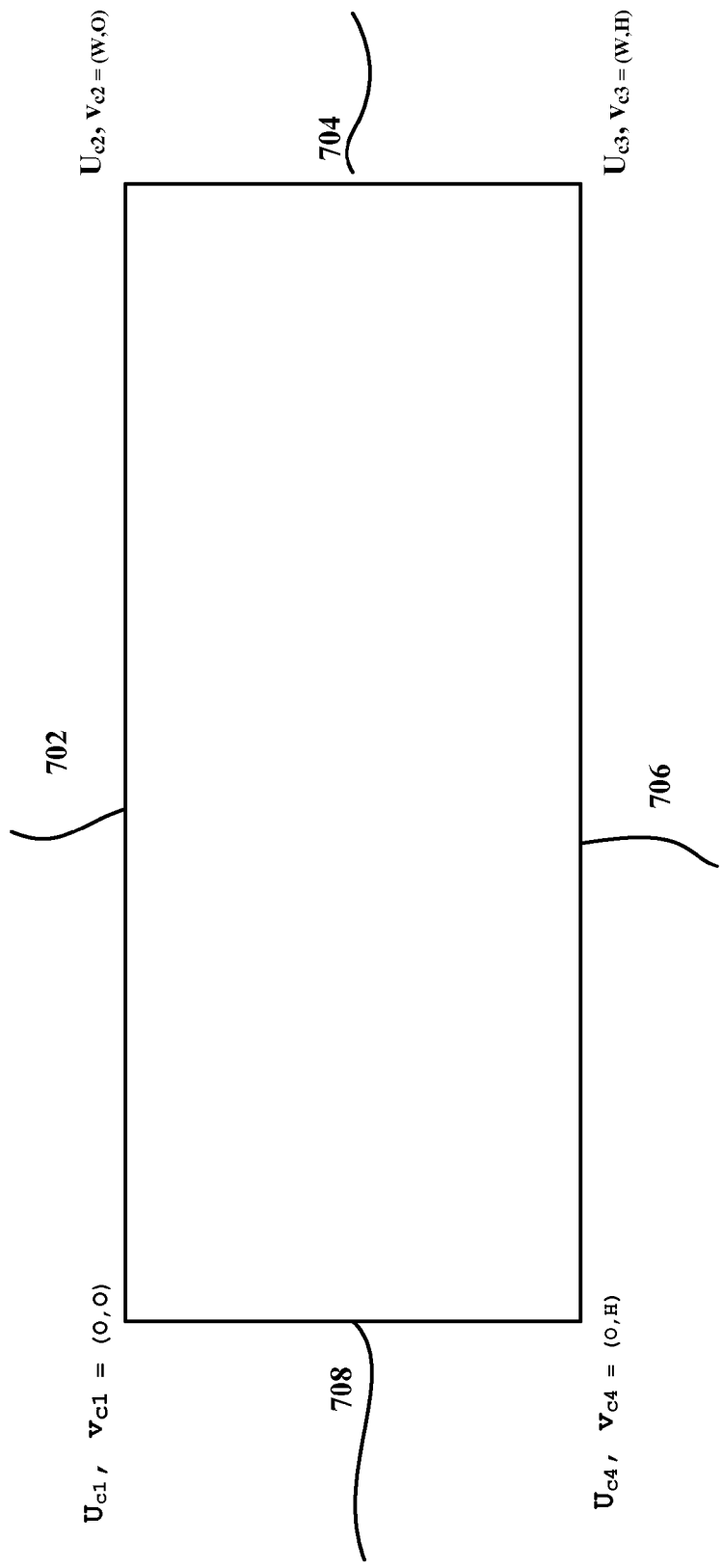
FIG. 7 provides an example of defined corners of an output image rectangle.

The device then calculates the output image size and validates it. This is done by first determining the length of the sides of original output image. See FIG. 7.

Top Side Length 702 ($L_T$)=$\sqrt{\{[x_{c,2}-x_{c,1}]^2+[y_{c,2}-y_{c,1}]^2\}}$ Right Side Length 704 ($L_R$)=$\sqrt{\{[x_{c,3}-x_{c,2}]^2+[y_{c,3}-y_{c,2}]^2\}}$ Bottom Side Length 706 ($L_B$)=$\sqrt{\{[x_{c,4}-x_{c,3}]^2+[y_{c,4}-y_{c,3}]^2\}}$ Left Side Length 708 ($L_L$)=$\sqrt{\{[x_{c,1}-x_{c,4}]^2+[y_{c,1}-y_{c,4}]^2\}}$ The maximum of each of the calculated parallel sides is selected. That is:

Set image width (W) as W=max($L_T, L_B$)

Set image height (H) as H=max($L_L, L_R$)

The device then verifies that the output size is within defined allowable metrics, such as those established by the Financial Services Technology Consortium.

Figure 5:
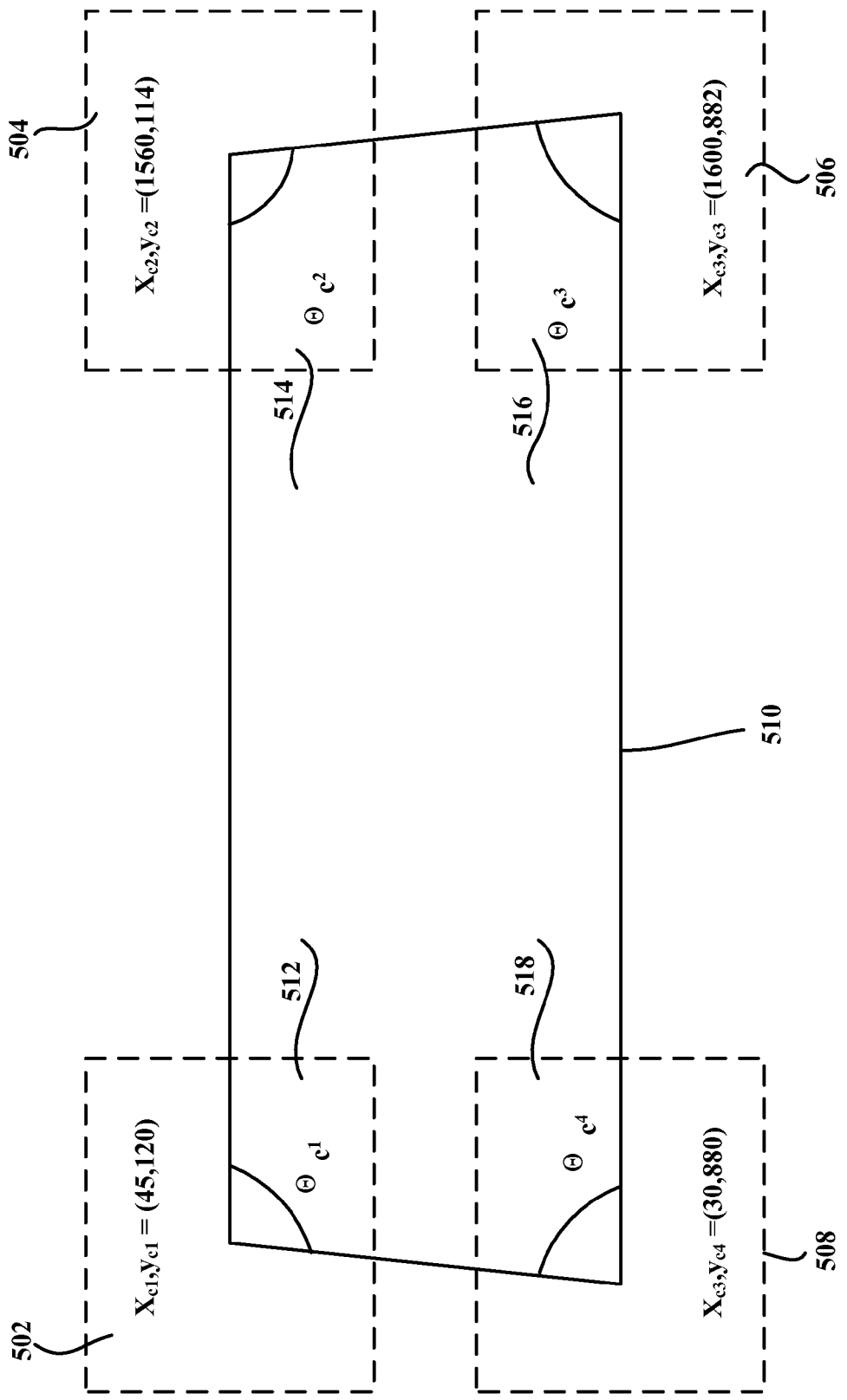
FIG. 5 provides an example of an uncorrected quadrilateral with defined corner coordinates.

By way of validation, the angles of the original image, see FIG. 5, are checked to verify that they are greater than 80 degrees and less than 100 degrees. This may be done calculating the angle of corner 1 (upper left) 512:

$\Theta_{c1}$=$\cos^{-1}\{[(x_{c,2}-x_{c,1})(x_{c,1}-x_{c,4})+(y_{c,2}-y_{c,1})(y_{c,1}-y_{c,4})]/(L_T)\times(L_T)\}$.

and determining if 80°≤$\Theta_{c1}$≤100°.
Similar calculations and determinations may then be undertaken for $\Theta_{c2}$ 514, $\Theta_{c3}$ 516, and $\Theta_{c4}$ 518.
If any $\Theta_{ci}$≤80° or 100°≤$\Theta_{Ci}$, then the image is rejected and a replacement image must be provided.

Geometric correction is then provided to transform the perspective from the input quadrangle image to an output rectangle image. See FIG. 7. The coordinates of the source corners of the original check image may be denoted as $x_{ci}, y_{ci}$. The output or "destination" corner coordinates, $u_{ci}, v_{ci}$, for the output rectangle image are set based upon the width (W) and height (H) calculated above. First, set $u_{c,1}, v_{c,1}$, for the upper left corner of the output rectangle image to be, $u_{c,1}, v_{c,1}$=(0,0). Then set the other three destination corners:

$u_{c,2}, v_{c,2}$=(W,0)

$u_{c,3}, v_{c,3}$=(W,H)

$u_{c,4}, v_{c,4}$=(0,H)

Utilizing these values in a series of linear equations programmed into the device, all other points are transformed utilizing basic perspective transformation mathematics. For example, one may employ the basic perspective transformation equations to calculate the coefficients of perspective transformation to map the original coordinates of each pixel, $x_i, y_i$, to their output destination.
That is:

$$ui = \frac{c_{00} * x_i + c_{01} * y_i + c_{02}}{c_{20} * x_i + c_{21} * y_i + 1}$$

$$vi = \frac{c_{10} * x_i + c_{11} * y_i + c_{12}}{c_{20} * x_i + c_{21} * y_i + 1}$$

where $c_{ij}$ are matrix coefficients. Utilizing the known values for the source corner coordinates and the destination corner coordinates, as determined above, and putting the linear equations into matrix format, the equations are equivalent to the following linear system:

$$\begin{pmatrix} x0 & y0 & 1 & 0 & 0 & 0 & -x0*u0 & -y0*u0 \\ x1 & y1 & 1 & 0 & 0 & 0 & -x1*u1 & -y1*u1 \\ x2 & y2 & 1 & 0 & 0 & 0 & -x2*u2 & -y2*u2 \\ x3 & y3 & 1 & 0 & 0 & 0 & -x3*u3 & -y3*u3 \\ 0 & 0 & 0 & x0 & y0 & 1 & -x0*v0 & -y0*v0 \\ 0 & 0 & 0 & x1 & y1 & 1 & -x1*v1 & -y1*v1 \\ 0 & 0 & 0 & x2 & y2 & 1 & -x2*v2 & -y2*v2 \\ 0 & 0 & 0 & x3 & y3 & 1 & -x3*v3 & -y3*v3 \end{pmatrix} \cdot \begin{pmatrix} c00 \\ c01 \\ c02 \\ c10 \\ c11 \\ c12 \\ c20 \\ c21 \end{pmatrix} = \begin{pmatrix} u0 \\ u1 \\ u2 \\ u3 \\ v0 \\ v1 \\ v2 \\ v3 \end{pmatrix},$$

from which the coefficients $c_{i,j}$ can be calculated by solving the system for $c_{i,j}$.

The device may solve the linear system by first calculating $M_{i,j}$ as the inverse matrix for $c_{i,j}$. The transformation for each pixel at original location $x_i, y_i$ to its destination location can then be performed according to the following equation:

$$(u_i, v_i) = dst(x_i, y_i) = src\left(\frac{M11*x_i + M12*y_i + M13}{M31*x_i + M32*y_i + M33}, \frac{M21*x_i + M22*y_i + M23}{M31*x_i + M32*y_i + M33}\right)$$

where: ($x_i, y_i$)=coordinates of pixel i source image;
src=source pixel color value;

($u_i, v_i$)=$dst(x_i, y_i)$=destination (output) image value

The result is a color cropped image 112 of the front of the document. The same process may also be performed on the image of the back of the document.

D. Scaling.

An operation may then be performed to scale the image 114 of the front of the document within a specified pixel width range 116. For example, based upon the Federal Reserve Bank's check image processing standard of 200 dots per inch (DPI), the operation may scale a check document image to between 1140 and 1720 pixels. While this typically requires down-scaling, certain devices with low resolution cameras may require an up-scaling operation. A similar operation may be performed to scale the image of the back of the document. The height of the image relies on a width to height aspect ratio and the corresponding number of pixels for the rear image does not have to be an exact match with the front of the check image document.

E. Conversion from Color Image to Black and White Image.

The color image may then be converted 118 to a black and white image. This may be done by performing a mathematical operation on the image in order to identify a luminosity value for each pixel as it is converted from color to gray scale. For example, it may use the formula: $L=0.299R+0.587G+0.114B$ in which R equals a red value, G equals a green value, B equals a blue value, and L is a resulting luminosity value. The software then evaluates each pixel to determine if it should be converted into a white or black pixel. It may do so in the following manner:

First, the pixel box blur value ("Blur Value") is determined using the "kernel box blur matrix" shown in FIG. 8. The pixel luminosity is averaged with surrounding pixels across a relatively broad area, as defined by the kernel box blur matrix, to define a Blur Value. For example, the pixel luminosity may be averaged with 16 surrounding pixels across a 15×15 matrix.

Second, the pixel luminosity ("Luminance") is determined using the "pixel luminance blur matrix":

$$\begin{matrix} 0 & 0 & 1 & 0 & 0 \\ 0 & 0 & 1 & 0 & 0 \\ 1 & 1 & 1 & 1 & 1 \\ 0 & 0 & 1 & 0 & 0 \\ 0 & 0 & 1 & 0 & 0 \end{matrix}$$

The pixel luminosity is averaged with near neighbor pixels, for example, 8 near neighbor pixels, as defined by the pixel luminance blur matrix, to define a local blurred pixel value.

Third, the difference between the Blur Value and the Luminance is calculated and compared to a threshold value ("Threshold") to determine whether a pixel is black or white. For example, it may do so using the following formula:

If Luminance<(Blur Value−Threshold), then, result is BLACK;
Otherwise,
result is WHITE.

Fourth, if a WHITE pixel may be determined from the preceding step, but the pixel Luminance (local value) and Blur Value are both below a fixed threshold (the "dark pixel threshold"), which, by way of example, may be set at 35%, then the pixel is nonetheless forced to BLACK.

Fifth, the darkness of the converted image is measured by dividing the number of black pixels by the total pixels in the document image ("Darkness Ratio"). This measurement may exclude a set region around the edges of the document (for example, one-quarter inch). If the Darkness Ratio is between predetermined optimal values (for example, 3.5% to 12% for the front image and 0.8% to 12% for the rear image), the operation is complete. If it is not within the optimal values, the threshold value used in the Third Step, above, is adjusted. That is, if the measured darkness is below the low threshold, the image is too light and needs to be darkened and the black and white conversion threshold value used in the Third Step, above, is decreased. On the other hand, if the measured darkness is above the high threshold, the image is too dark and needs to be lightened, and the black and while threshold value used in the Third Step is increased. The conversion process beginning in the Third Step, above, is then performed again. This process is repeated until the Darkness Ratio is within the optimal value range or a predetermined number of maximum times; for example, 5 times. The result, if successful, is a cropped, scaled, and black and white image 120. If, after the maximum adjustment and repetitions are performed the Darkness Ratio still is not within optimal values, the image is rejected.

F. Transmission of the Document Image from Device to Server.

Once the image of the document is scaled, cropped, and converted to black and white, it is transmitted 122 to a computer server 124. According to one embodiment of the present invention, a front color image of the document also may be transmitted to the server in addition to the black and white front and rear images of the document. The color image may be presented to the server in the same scale as the black and white image but may rely upon a lower-quality file.

G. Quality Tests of Black and White Image.

The front side of the converted black and white document image received at the server is subject to analysis through a series of tests and operations on the document image. The back side of the document image may also be subject to analysis through some or all of these tests and operations. In one embodiment of the invention, the testing is performed iteratively, as follows.

After the image is presented to the server, an initial dots per inch (DPI) is set equal to a ratio of the pixel width of the document image (DPW) to an initial test pixel width (TPW). The document is then tested with a document reader software to arrive at an initial quality score (S1) for the image. That score is evaluated and, if further testing is desired, the initial pixel width is increased by an increment to create a second pixel width (TPW2) and a second DPI (DPI2) is calculated equal to a ratio of DPW to TPW2. The document image is again tested with a document reader software to arrive at a second score (S2) and the results are evaluated. If further testing in desired, the TPW is iteratively increased by an increment to create successive TPWi values and a next iteration DPIi is calculated equal to a ratio of DPW to TPWi. The document is again tested with a document reader software to arrive at an iteration score (Si), and this process is carried out iteratively, which may continue until the TPWi equals or exceeds the pixel width of the document, DPW.

For example, if the document is a check, tests may be performed using available commercial check reading software such as "CheckReader" from A2iA Corporation. The front images may be tested for image quality and usability, amount recognition, and recognition of the MICR codeline, comprising, for example, the following standard fields:

Auxiliary OnUs
Routing number
Field 4
Account number
Process Control/Trancode

The testing of a financial document with an MICR Codeline and document amount may proceed along the following steps:

Step 1.

The image of the document received at the server may be tested for MICR codeline and document amount. For example, this may be done using CheckReader tests for:

Courtesy Amount Recognition ("CAR") and Legal Amount Recognition ("LAR")

MICR Codeline

Check number

In some embodiments of the invention, the image is tested multiple times, at virtual sizes of a predetermined width, such as 1200 pixels, up to or beyond the source image pixel width, in various predetermined increments. For example, using 100 pixel increments, the document is tested at certain specific virtual sizes, such as 6", 6½", 7", 7½", 8", and up to the source document size or larger. By way of example, this iterative process may be described as follows:

Where:

InputPixelWidth=pixel width of input cropped image, $i$=iteration, pixelWidth($i$)=iteration pixel width, (pixelWidth+)=amount of increment of pixelWidth for each iteration, such that pixelWidth($i$+1)=pixelWidth($i$)+pixelWidth+;

pixelWidth($i$) inputPixelWidth; and $dpi(i)$=dpi for iteration ($i$)

Set document dpi for each iteration to:

$dpi(i)$=200*[inputPixelWidth/pixelWidth($i$)]

Test via a check reader software such as CheckReader

Check reader software return results

Evaluate results

Return to top (until pixelWidth(i)>inputPixelWidth)

If, for example, the input cropped image is 1712 pixels wide, the first test iteration could be done at a pixel width of 1200 (equivalent to a 6" wide image), then at increments of 100 pixels, such that:

InputPixelWidth=1712 pixelWidth(1)=1200

(pixelWidth+)=100:

So that an initial dpi(1) is calculated for the first iteration as $$dpi(1) = 200 * [1712/1200]$$
$$= 285 DPI$$

Test this first iteration image via a check reader software

Evaluate Results

Return to top (until pixelWidth(i)>inputPixelWidth)

The same calculations are then carried out for pixelWidth (i) of 1300, 1400, 1500, 1600, 1700, and 1712.

In one embodiment of the invention, the results of the iterative tests as applied to the MICR Codeline may be evaluated using a weighting process. In this embodiment, for each iteration, the number of characters of the MICR Codeline that are read are multiplied by a factor to calculate a first character weighting factor for that iteration. The number of fields of the MICR line that are read are then multiplied by a second weighting factor to arrive at a fields weighting factor for that iteration. The character weighting value and the fields weighting value for each iteration are then added to the MICR score for that iteration. The best score from all iterations may then be chosen.

In one embodiment, a weighting is applied to each score returned by the check reader test. The weighting takes into account the number of characters observed in the MICR code line, plus the total number of fields read in the MICR code line, as follows:

Where

Weighted Score for iteration (i)=WS(i)

MICR score for iteration (i)=MScore(i)

-of-characters-read=number of characters read

-of-fields-read=number of fields read $W1=1^{st}$ weighting factor $W2=2^{nd}$ weighting factor Then $$WS(i)=MScore(i)+(W1*\text{\#-of-characters-read})+(W2*\text{\#-of-fields-read})$$

The resulting best score from all iterations is chosen 126.

For example, if the check reader software CheckReader is used for testing, a MICR score of between 0 and 1000 will be returned, W1=W2=50, and the following weighting formula will be used:

$$WS(i)=MScore(i)+(50*\text{\#-of-characters-read})+(50*\text{\#-of-fields-read})$$

If CheckReader returns a MICR line from the first iteration (where the letters in the returned line shown below merely represent field separators, not characters)

d211391773d12345678c1234c with a Mscore(1)=900, then

-of-characters-read=21

-of-fields-read=3, and $$WS(1)=900+(50*21)+(50*3)=2100$$

In one embodiment of the invention, a correct check number may be inserted into the check number field in an image of a MICR Codeline ("check number plugging routine"). This is accomplished by reading the check number printed on the check image document, testing the quality of the read check number to determine a confidence score, and retaining the check number if the confidence score is above a specified value. The check number field within the MICR Codeline is then read and compared to the retained check number. If there is at least a partial match, the retained check number is placed into the check number field of the MICR Codeline.

For example, a check reader software program may be used to identify the check number printed at the top right of a check image document. The program then provides the check number value along with a test score. This result is then stashed if the test score is above a high confidence threshold. If the check number within the MICR code line, or any portion of it, can be read, the stashed result is searched for a match or partial match in order to activate a check number plugging routine as a way of "repairing" the check number field in the MICR code line. This will occur if the parsed value in the code line contains a partial match to the value of the check number read from the top right of the check document.

Additional quality tests 130 may be performed. In one embodiment of the invention, the accuracy of an electronic reading of a MICR Codeline is tested by using a check reading software to provide multiple test result scores corresponding to ranked probabilities of MICR Codeline reads. The read with the top score is selected if all scores equal or exceed a specified high number. If any scores are less than the high number but greater than or equal to a midway number, a specified number of the top ranked reads are considered and only those fields that match across all such reads are accepted. If any of the scores are less than the midway number but greater than a low number, a larger number of the top ranked reads are considered and only those fields that match across all those reads are accepted.

For example, the check reading software may provide test result scores ("confidence scores") for the MICR code line read with multiple ranked probabilities in descending order. If all scores are equal to or exceed a certain high number (for example, 850), the top score is selected and the remainder of the test scores are ignored. If any scores are in the range of greater than or equal to a midway number (for example, 500), but less than the high number, the top two ranked MICR code line reads are used and only those fields that match across both reads are accepted. If any of the scores are greater than or equal to a low number (for example, 200), but less than the midway number, the top three ranked MICR code line reads are used and only those fields that match across all three reads are accepted. This operation may be mated with the check number plugging routine (immediately above) as appropriate.

In some embodiments, the courtesy amount recognition (CAR) and the legal amount recognition (LAR) of the check image document are tested across multiple DPIs, with a score provided for each test. Only the top score provided for amount recognition may be relied upon.

In some embodiments of the invention, the color image of the check document may also be transmitted from the device to the server and used to further test the accuracy of the transmitted check image. If testing of the black and white image indicates that the image is not acceptable 134 because one or more of the routing number, the account number, or all of the Auxiliary OnUs, the Field4, and Process Control fields of the MICR Codeline are missing or illegible on the black and white image, the above described quality tests are performed on the color image of the check document to determine confidence scores for the corresponding fields of the MICR Codeline on the color image 136. The field or fields from said color image are then used when the confidence score for said field or fields exceeds the confidence score for the corresponding field of the black and white image.

For example, if the MICR Codeline field results obtained from the check reader for the black and white image of the financial document reveal that the routing number and/or account number field are missing, or Auxiliary OnUs, Field4, and Process Control fields are all missing, the front color image of the document will be sent to the check reader software. This color image may be processed and analyzed as described above. The document amount and code line for the color image may then be output. If an amount is output and the quality or confidence score for that field from the color image exceeds that of the black/white image, this amount will be applied to the document. A field by field test of the MICR Codeline of the color image of the document may then be performed. If a value is present from the color image, and either the corresponding field value from the black and white image is missing or was read with a lower confidence score than from the color image, the field from the color image will be applied to the document. The score for each field of the MICR code line from the color image is compared to the score from the corresponding field from the MICR code line from the black and white image, and the highest score from each comparison is accepted.

Step 2.

In some embodiments of the invention, quality testing may include image quality, usability and analysis ("IQU&A") testing and optimal document scale determination. Based on the scores derived as described above, which may be weighted, an optimal size and DPI are selected and the image is tested again using a check reader software, such as Check-Reader, as follows.

First, the size of the check image document is selected 128 according to where the best overall MICR code line read is obtained. The DPI is then set to this optimal size to enable a second set of image quality and image usability tests 130 to be performed. Detailed MICR code line character results may also be obtained from the check reader software. The optimal scale of the check document image is then determined by measuring the input width of the image in pixels, measuring the height of the transit q-symbol in the MICR code line of the check image in pixels, and scaling the document by multiplying the input width by 25 and dividing the product by the said measured height of the transit q-symbol in pixels.

That is, the height of the transit q-symbol in the MICR code line is measured and compared to a 25 pixel standard. The optimal scale of the document is determined using the following formula:

$$\text{optimalWidth} = \text{inputPixelWidth} * (25/\text{measuredHeightOfSymbol})$$

All IQU&A test results, along with the document amount, codeline, and optimal width, may be output.

The invention claimed is:
1. A method for locating and adjusting a document image consisting of a plurality of pixels within a viewfinder of an image capturing device within a mobile communication device, comprising:
   acquiring an image of a document on the device;
   adjusting the luminosity value of a plurality of the pixels of the quadrilateral document image, wherein the adjustment of the luminosity value of the pixels is carried out in a plurality of subregions of the quadrilateral document image, and the adjustment of luminosity value of each of the pixels comprises blurring the luminosity value of the pixel based upon its luminosity value and the luminosity value of other pixels within a specified distance from the pixel;
   determining the location of the corners of the quadrilateral document image based upon statistical analysis of variations of the adjusted luminosity values, wherein determining the location of each corner comprises:
   a. iteratively quantifying a luminosity difference for each of a plurality of candidate first coordinate pixel locations for the corner in the direction of a first coordinate axis in the two-dimensional plane of the image wherein:
      i. the said luminosity difference is quantified by the difference in adjusted luminosity value of pixels in the vicinity of each said candidate first coordinate pixel locations;
      ii. each luminosity difference is compared to a predetermined value;
      iii. a first set of candidate first coordinate pixel locations is created comprising those candidate first coordinate pixel locations with a luminosity difference greater than said predetermined value;
   b. for each said candidate first coordinate location in said first set, calculating a qualifying number that is equal to the number of other candidate first coordinate pixel locations within said first set with a coordinate value within a specified distance from said candidate first coordinate location;
   c. creating a second set of candidate first coordinate pixel locations comprising those candidate first coordinate pixel locations with the greatest qualifying number;

d. selecting from said set, as the first coordinate for the corner location, the candidate first coordinate pixel location with the greatest luminosity difference;

e. performing steps c-f for candidate second coordinate pixel locations for the corner in the direction of a second coordinate axis in the two-dimensional plane of the image to determine the second coordinate for the corner location; and utilizing said location of said corners to transform the quadrilateral document image into a rectangular document image.

2. The method of claim 1, wherein iteratively quantifying a luminosity difference for each of a plurality of candidate coordinate pixel locations for the corner in the direction of a coordinate axis in the two-dimensional plane of the image further comprises:

a. selecting a second coordinate value along the second coordinate axis in the plane of the image;

b. selecting a pixel location with said second coordinate axis value and a first coordinate value along the first coordinate axis in the plane of the image;

c. evaluating the relative adjusted luminosity along the first coordinate axis in the vicinity of said pixel location by:
  i. determining whether said adjusted luminosity difference exceeds a specified threshold;
  ii. recording said adjusted luminosity difference and said first coordinate value as a candidate first coordinate pixel location if said adjusted luminosity difference exceeds a specified threshold;

d. if said adjusted luminosity difference does not exceed said specified threshold, iteratively repeating steps b-c with said second coordinate value and successively increasing first coordinate values until the adjusted luminosity difference exceeds said specified threshold;

e. iteratively repeating steps a-d for a predetermined number of different second coordinate values along the second coordinate axis in the plane of the image to create a first set of candidate first coordinate pixel locations.

3. The method of claim 2, wherein evaluating the relative adjusted luminosity along a coordinate axis in the vicinity of said pixel location further comprises:

a. calculating a first collective adjusted luminosity value of a first set of pixels located within a specified distance from said pixel location in one general direction along the coordinate axis;

b. calculating a second collective adjusted luminosity value of a second set of pixels located a specified distance in the opposite general direction from the said pixel location along the same coordinate axis;

c. calculating an adjusted luminosity difference for said pixel location by calculating the difference between the first collective adjusted luminosity value and the second collective adjusted luminosity value.

4. The method of claim 1 wherein utilizing said location of said corners to transform the quadrilateral document image into a rectangular document image comprises:

determining the coordinates of the corners of the quadrilateral document image captured on the device;

utilizing the coordinates of the quadrilateral document image to determine the maximum length of each of the two sets of the opposing sides of the quadrilateral document image;

calculating the coordinates of a rectangle having two sets of opposing sides that are respectively substantially equal to the respective maximum length of each set of the opposing sides of the quadrilateral image and containing the coordinates of the corners of the quadrilateral document image; and transforming a majority of the pixel values from the quadrilateral document image to the rectangular image.

* * * * *